3,037,945
ANION EXCHANGING AND CHELATING RESINS HAVING PRIMARY AMINO GROUPS

Leo R. Morris, Midland, Mich., assignor to The Dow Chemical Company, Midland, Mich., a corporation of Delaware
No Drawing. Filed Jan. 14, 1959, Ser. No. 786,692
5 Claims. (Cl. 260—2.1)

This invention concerns a method for making polyalkylene polyamine anion exchanging and chelating resins having free amino groups and the products thereof.

Conventional amine type anion exchanging resins which are highly crosslinked are slow in attaining equilibrium in various reactions. They are usually prepared by reacting a halomethylated vinylaryl resin, e.g., a chloromethylated or bromomethylated crosslinked polystyrene, with a polyalkylene polyamine such as diethylene triamine. Reaction involves both the primary and secondary amino groups. As a consequence, at least about half of the primary amino groups are reacted as well as a substantial proportion of the secondary amino groups. The reaction thus unavoidably gives rise to a relatively highly crosslinked product, slow in attaining equilibrium.

It has now been discovered that by forming a Schiff's base by the interaction of an aldehyde having not more than three carbon atoms with the primary amino groups of those polyalkylene polyamines heretofore used in making conventional polyamine anion exchanging resins (i.e., those containing at least one secondary amino group and two primary amino groups, having the general formula: $H_2N(CH_2CH_2NH)_xH$, wherein $x$ ranges between 2 and 5) and then reacting the Schiff's base with a 1 to 4 weight percent crosslinked halomethylated vinylaryl polymer, a product is obtained which behaves as if it is much less crosslinked. Thereafter the aldehyde is removed by hydrolysis, advantageously by acid hydrolysis to give a resin having polyalkylene polyamine substituents. Performance characteristics suggest that the resin products have a preponderance of prototype units of the formula:

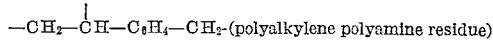
—CH$_2$—CH—C$_6$H$_4$—CH$_2$—(polyalkylene polyamine residue)

wherein said (polyalkylene polyamine residue) is linked through a secondary amino nitrogen thereof to benzylic carbon, and wherein polyalkylene polyamine has the significance indicated above.

The halomethylated vinylaryl resin reactants used in this invention are conventional halomethylated copolymers containing a mixture of a vinylaryl hydrocarbon, e.g., styrene, o-, m-, and p-methylstyrene, vinylnaphthalene, and their homologs, with about 1 to about 4 weight percent of a divinylaryl hydrocarbon, e.g., divinylbenzene, the mixture containing a predominant amount of vinylaryl hydrocarbon and the copolymer containing on the aryl nuclei substituent bromoethyl or chloromethyl groups, advantageously between about 0.5 and 1.2 of such halomethyl groups per aromatic nucleus. The starting copolymers are prepared by conventional mass, emulsion or suspension procedures. Emulsion and suspension procedures are preferred since they give resin beads of a controllable size.

The polyalkylene polyamine reactants include diethylene triamine through pentamethylene hexamine. Of these, diethylene triamine is preferred. A 1 to 5 mole equivalent of amine is used for each equivalent of halomethyl.

Aldehydes such as formaldehyde, acetaldehyde and propionaldehyde as such or formed in situ from their polymers are used in forming Schiff bases with the indicated polyalkylene polyamines. Reaction temperatures between 50° and 100° C. are used, preferably between 80° and 100° C. A 1 to 3 mole equivalent of aldehyde for each equivalent of polyalkylene polyamine can be used, but 1½ to 2 mole equivalents of aldehyde per mole equivalent of polyalkylene polyamine is preferred.

In practice, the halomethylated polymer is first swollen to facilitate its reaction with the Schiff base. Any conventional swelling agent can be used, the most common of which are aromatic hydrocarbons such as benzene and toluene, and chlorinated hydrocarbons, such as methylene chloride, perchloroethylene, etc. Thereafter, an aqueous solution of the Schiff base is added to the swollen resin in at least a stoichiometric equivalent and preferably an excess, and reacted by heating to between about 40° and about 100° C., suitably at reflux, until maximum capacity has been achieved, advantageously as determined by a test sample. Generally a reflux time of up to about 24 hours is required. Thereafter supernatant liquor is decanted and the resulting product is water-washed to remove most of the yellow color due to excess Schiff base. An excess of mineral acid, advantageously about six-normal hydrochloric acid, is then added with warming for about ten minutes to liberate aldehyde. The acid is then decanted and a new portion may be added and refluxed advantageously for about two hours to remove any remaining aldehyde. The resin product, after liberation of aldehyde, is then filtered, washed with ammonium hydroxide and then with water to give a chelating or anion exchanging resin product.

The following examples describe specific embodiments of this invention, it being understood that they are descriptive and not limitative of the invention, which is defined in the claims.

Example 1

A quantity of 20 g. of chloromethylated polystyrene beads (crosslinked with 1 weight percent of divinylbenzene) was swollen with 100 ml. methylene chloride to give complete uptake of the swelling agent. A mixture of 30.5 g. of distilled diethylene triamine in 50 ml. of water was carefully added to a slurry of 16.0 g. of paraformaldehyde in 50 ml. of water to give a pale yellow clear solution. This solution was then added to the swollen resin and the mixture was heated to reflux, about 40° C., for 20 hours. After decanting the supernatant, the resin was water-washed to remove much of the yellow color of the Schiff base. Then 200 ml. of six-normal hydrochloric acid was added with warming for 10 minutes. After decanting this acid, a new portion of acid was added and refluxed for 2 hours. After filtering, washing with ammonium hydroxide and finally with water, a quantity of 49.5 g. of pale yellow resin beads was obtained. Its capacity was 1.73 mmoles $Cu^{++}$/g. dry resin.

Example 2

Two resins were made up according to the procedure of Example 1 and compared with two blanks made by reacting crosslinked chloromethylated polystyrene with diethylene triamine (abbreviated as DIEN) pursuant to the procedure of McBurney's U.S. Patent 2,591,574. Compositions and results are given in the following table.

| DVB, percent | H$_2$O Content (Swollen), percent | HCHO:DIEN Mole ratio | Cu$^{++}$—Co$^{++}$ [1] capacity mmoles /g. dry resin |
|---|---|---|---|
| 2 | <40 | No HCHO (Blank) | 0.06 |
| 1 | 61 | No HCHO (Blank) | 0.65 |
| 1 | 67 | 1.9:1 | 1.73 |
| 1 | 67 | 2.1:1 | 1.31 |

[1] Capacity was determined in the following way. An excess of a solution ca. 0.1 molar in Cu$^{++}$ and Co$^{++}$, buffered to pH 5 with 0.25 molar KOAc-HOAc was contacted for 30 minutes with the resins above-indicated, also buffered to pH 5 with KOAc-HOAc. Subsequent washing with water and 2-6-normal mineral acid then was followed by polarographic analysis of the metal picked up by the resins.

What is claimed is:

1. A method for making an anion exchanging and chelating resin wherein a halomethylated copolymer of a monovinylaryl hydrocarbon and from about 1 to about 4 weight percent of a divinylaryl hydrocarbon, said copolymer containing between about 0.5 and about 1.2 halomethyl groups per aryl nucleus, is reacted by heating at about 40° to about 100° C. with at least a stoichiometric equivalent of a Schiff base prepared from a polyalkylene polyamine having 2 primary amino groups and from 1 to 4 secondary amino groups and an aldehyde having from 1 to 3 carbon atoms, and hydrolyzing off the combined aldehyde to leave primary amino groups, whereby polyalkylene polyamine residues are linked at benzylic carbon atoms of said copolymer through a secondary amino nitrogen of said polyalkylene polyamine.

2. The method of claim 1, wherein the resin reactant is a chloromethylated styrene copolymer containing between about 1 and about 4 weight percent of divinylbenzene.

3. The method of claim 2, wherein the Schiff base is prepared from diethylene triamine and formaldehyde.

4. The method of claim 3, wherein the combined formaldehyde is hydrolyzed off with 6-normal hydrochloric acid and the resulting resin is converted to the basic form with ammonium hydroxide and water-washed.

5. Product of the process of claim 1.

References Cited in the file of this patent

UNITED STATES PATENTS 2,840,533   Hwa ------------------ June 24, 1958